United States Patent
Bengtsson et al.

(10) Patent No.: US 8,279,567 B2
(45) Date of Patent: Oct. 2, 2012

(54) CIRCUIT BREAKER WITH IMPROVED RE-CLOSING FUNCTIONALITY

(75) Inventors: Tord Bengtsson, Vasteras (SE); Gabriel Olguin, Santiago (CL); Jianping Wang, Vasteras (SE)

(73) Assignee: ABB Research Ltd. (CH)

( * ) Notice: Subject to any disclaimer, the term of this patent is extended or adjusted under 35 U.S.C. 154(b) by 0 days.

(21) Appl. No.: 12/969,298

(22) Filed: Dec. 15, 2010

(65) Prior Publication Data
US 2011/0085273 A1    Apr. 14, 2011

Related U.S. Application Data

(63) Continuation of application No. PCT/EP2009/057480, filed on Jun. 16, 2009.

(30) Foreign Application Priority Data

Jun. 25, 2008 (EP) .................................. 08158935

(51) Int. Cl.
*H02H 3/00* (2006.01)
(52) U.S. Cl. ............ 361/65; 361/42; 324/509; 324/522
(58) Field of Classification Search .................. None
See application file for complete search history.

(56) References Cited

U.S. PATENT DOCUMENTS

| | | | |
|---|---|---|---|
| 2,384,362 A | | 9/1945 | Anderson |
| 4,454,555 A | | 6/1984 | DeLacy |
| 5,644,293 A | * | 7/1997 | Right et al. ............. 340/507 |
| 6,452,767 B1 | * | 9/2002 | Brooks .................... 361/42 |
| 2008/0024142 A1 | | 1/2008 | Opfer et al. |

FOREIGN PATENT DOCUMENTS

| | | |
|---|---|---|
| DE | 3429150 A1 | 2/1986 |
| GB | 171009 A | 11/1921 |
| WO | 2007114566 A1 | 10/2007 |

OTHER PUBLICATIONS

International Preliminary Report on Patentability; PCT/EP2009/057480; Jun. 1, 2010; 11 pages.
International Search Report and Written Opinion of the International Searching Authority; PCT/EP2009/057480; Sep. 8, 2009; 9 pages.

* cited by examiner

*Primary Examiner* — Jared Fureman
*Assistant Examiner* — Terrence Willoughby
(74) *Attorney, Agent, or Firm* — St. Onge Steward Johnston & Reens LLC

(57) ABSTRACT

A circuit breaker for protecting a power line. The circuit breaker includes a control unit and a circuit breaking element disconnecting the power line from a power source. The control unit detects a fault on the power line, opens the circuit breaking element, which opening starts a disconnection time interval, injects a test signal into the power line, measures a response, determines an impedance of the power line from the response, analyses the impedance during the time interval based on comparing the impedance with a reference threshold, determines a permanent or a temporary fault based on the analysed impedance, re-closes the circuit breaking element after the time interval if the fault is temporary and keeps the circuit breaking element open after the time interval if the fault is permanent.

14 Claims, 2 Drawing Sheets

CIRCUIT BREAKER WITH IMPROVED RE-CLOSING FUNCTIONALITY

CROSS-REFERENCE TO RELATED APPLICATIONS

The present application is a continuation of pending International patent application PCT/EP2009/057480 filed on Jun. 16, 2009, which designates the United States and claims priority from European patent application EP08158935.0 filed on Jun. 25, 2008, the content of which is incorporated herein by reference.

FIELD OF THE INVENTION

The present invention generally relates to the field of electrical power supply systems. The invention more particularly relates to a circuit breaker for protecting a power line as well as a method of operating a circuit breaking element and being performed in a circuit breaker.

BACKGROUND OF THE INVENTION

The circuit breakers of today that are being provided in electrical power lines of power supply systems are not only provided with a circuit breaking element, i.e. an element that disconnects the power line from a power source, they are also provided with fault detecting abilities. They thus detect a fault on a power line and then open the circuit breaking element.

Circuit breakers are furthermore often equipped with a re-closing functionality. This means that after opening the circuit breaking element upon a detection of a fault, like for instance a low impedance, the circuit breaking element is again closed after a pre-determined disconnection time interval has lapsed, where the length of this time interval is dependent on the frequency used in the supply of power. In the case of a power supply frequency of 50 Hz it is usually around half a second long. If then the fault remains, i.e. is a permanent fault, the circuit breaking element is again opened and thereafter kept open until the fault has been removed. Such fault removal is normally performed by service personnel and may therefore take considerable time. The reason for such re-closing is that many faults are temporary, i.e. of a transient nature, and will disappear after some time. This may for instance be the case with lightning striking a power line. In order to not to keep the power down for too long it is then advantageous if the circuit breaking element is re-closed so that power supply can be resumed if the fault no longer exists.

WO 2007/114566 gives an example of a circuit breaker, which can be used for such normal circuit breaker operation.

However, if the fault is a permanent fault, like for instance if the power line has fallen on the ground, the re-closing would just lead to an immediate opening again. To open and close a circuit breaking element in the case of such permanent faults are strenuous for the equipment in a power supply system. They are normally not dimensioned for prolonged or repeated exposure to current and/or voltage levels that exist during such permanent faults, especially if the fault is a grounding fault. They may thus break down because of such faults. Such a permanent fault can also have a very severe impact on the power supply system. A fault may spread over a large area of the power supply system as a sudden depression of voltage or voltage sag which might trip sensitive devices. The efforts needed to reinstate the devices and the power network, are of serious concern. Also the circuit breaker may break down.

It would therefore be of interest not to perform re-closing in a circuit breaker in case of a permanent fault but still use the re-closing functionality for temporary faults.

It is at the same time hard to determine if a fault is temporary or permanent when the circuit breaking element is open, since the current and voltage of the power line are normally used in determining these types of fault. When the circuit breaker has broken the connection with the power source it is then not possible to measure these currents and voltages.

DE 3429150 describes the principle of injecting a signal having an audio frequency into a power line for determining that a safety ground does not remain before this power line is put into use. The earthing of the power line is here checked through measuring the power of the signal returned by the power line.

It would therefore be of advantage to provide an improved re-closing functionality of a circuit breaker, where it is possible to separate a temporary fault from a permanent fault in order not to put unnecessary strain on the equipment used in power supply systems.

SUMMARY OF THE INVENTION

The present invention is therefore directed towards providing an improved circuit breaking functionality in a circuit breaker.

The invention is based on the general idea that a test signal at a main frequency is injected into a power line that has been disconnected from a power source by a circuit breaking element, the response to this test signal is measured and used for determining an impedance to ground of the power line. The impedance is then analysed and a temporary or a permanent fault is determined based on the analysis. A re-closing of the circuit breaking element is then made if the fault is determined to be a temporary fault and otherwise the circuit-breaking element remains open.

One object of the present invention is therefore to provide a circuit breaker for protecting a power line with an improved circuit-breaking functionality.

This object is according to a first aspect of the present invention solved through a circuit breaker for protecting a power line comprising:

a circuit breaking element for disconnecting the power line from a power source, and a control unit arranged to
  detect a fault on the power line, open the circuit breaking element based on said detected fault, which opening starts a predetermined disconnection time interval,
  inject a test signal at a main frequency into said power line,
  measure a response voltage and a response current in the power line, where the response voltage and the response current result from the test signal
  determine an impedance to ground of the power line from the response voltage and the response current,
  analyse the impedance to ground of the power line during said disconnection time interval, said analysing including comparing the impedance to ground with a reference threshold,
  determine a permanent or a temporary fault of the power line based on the analysed impedance to ground,
  re-close the circuit breaking element after the expiry of the disconnection time interval if the fault is determined to be a temporary fault, and
  keep the circuit breaking element open after the expiry of the disconnection time interval if the fault is determined to be a permanent fault.

Another object of the present invention is to provide a method of operating, by a circuit breaker, a circuit breaking element being provided in an electrical power line, which method has an improved circuit-breaking functionality.

This object is according to a second aspect of the present invention solved through a method of operating a circuit breaking element and being performed in a circuit breaker, comprising the steps of:

detecting a fault on the power line, opening the circuit breaking element, which opening starts a predetermined disconnection time interval, injecting a test signal at a main frequency into said power line, measuring a response voltage and a response current in the power line, where the response voltage and the response current result from the test signal, determining an impedance to ground of the power line from the response voltage and the response current, analysing the impedance to ground of the power line during said disconnection time interval, said analysing including comparing the impedance to ground with a reference threshold, determining a permanent or a temporary fault of the power line based on the analysed impedance to ground, re-closing the circuit breaking element after the expiry of the disconnection time interval if the fault is determined to be a temporary fault, and keeping the circuit breaking element open after the expiry of the disconnection time interval if the fault is determined to be a permanent fault.

The present invention has a number of advantages. It provides an improved circuit breaker, where it is possible to separate a permanent fault from a temporary fault. It is therefore possible to re-close the circuit breaking element only when the fault is temporary and not when it is permanent. This reduces the strain on the power supply system caused by a permanent fault. At the same time the use of the power line is continued in case of a temporary fault. The impedance to ground is furthermore determined automatically.

The injected test signal can be a voltage or current signal. The term main frequency illustrates that the test signal is a time-varying signal the frequency spectrum of which shows one clearly dominating frequency. The simplest embodiment is a sinusoidal test signal. But a composition of different frequencies is also applicable as long as one main frequency can be detected.

It is advantageous to choose the main frequency at an off-nominal value of the frequency used by the power source, i.e. at a value that can be clearly distinguished from any other harmonic present in the power line.

According to one variation of the present invention also the distance to the fault is determined. Through determining the distance to a fault it is furthermore easy to know where service actions are to be performed. This allows counter-measures for removal of the fault to be applied faster.

BRIEF DESCRIPTION OF THE DRAWINGS

The present invention will in the following be described with reference being made to the accompanying drawings, where FIG. 1 schematically shows a load being connected to a power source via a power line in which a circuit breaker according to the present invention is provided, FIG. 2 schematically shows a circuit breaker according to the present invention.

DETAILED DESCRIPTION OF THE INVENTION

In the following, a detailed description of preferred embodiments of a device and a method according to the present invention will be given.

Figure 1:
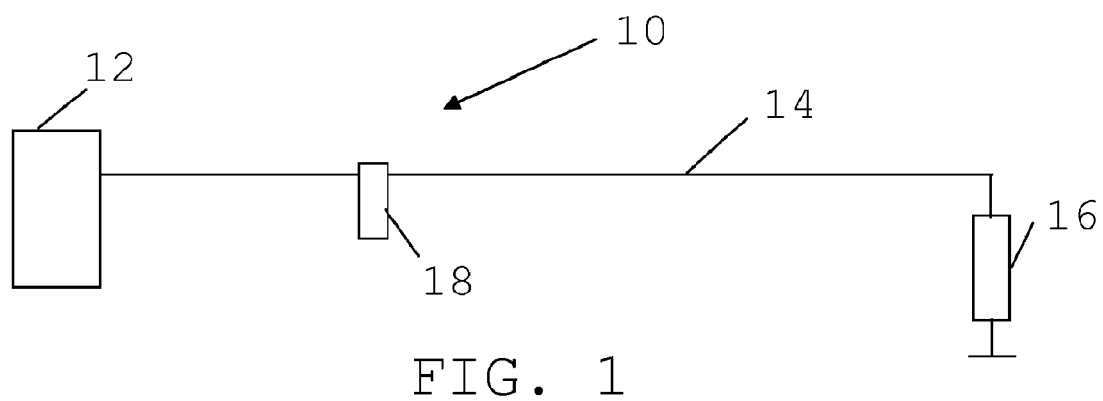

FIG. 1 schematically shows a power supply system 10 in which a circuit breaker 18 according to the invention may be provided. In FIG. 1 there is shown a load 16, which is connected to a power source 12 via a power line 14. In the power line 14 there is provided a circuit breaker 18 according to the present invention. For simplicity there is just one power line 14 shown in FIG. 1. It should however be realised that there may be more power lines, like for instance three or four between the power source 12 and the load 16, being provided in a three-phase system. Then each phase would be provided with its own circuit breaker. It should furthermore be realised that there may be provided more circuit breakers in a power line that the one shown in FIG. 1.

Figure 2:
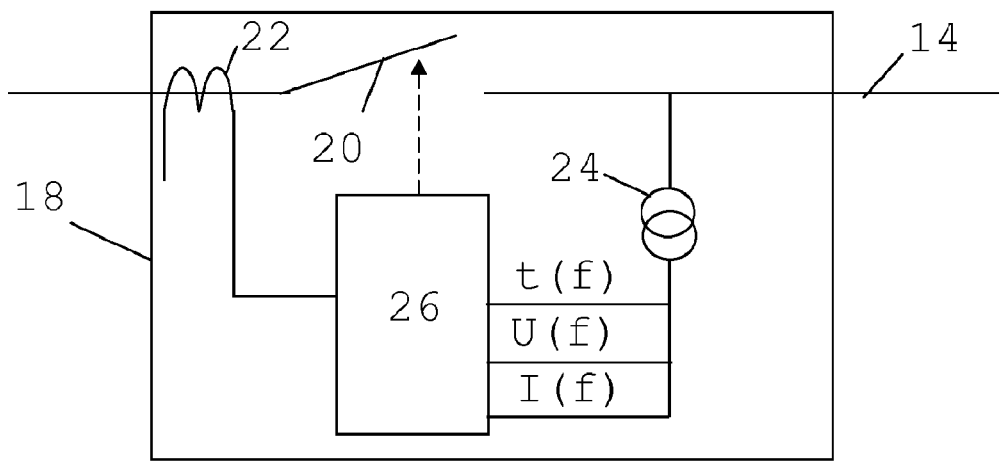

FIG. 2 schematically shows a circuit breaker 18 according to one embodiment of the present invention. The circuit breaker 18 includes a circuit breaking element 20, for instance a relay or a switch, that is provided in the power line 14. There are furthermore a pair of measurement transformers provided on both sides of the circuit breaking element 20. There is a current transformer 22 connected in the power line 14 in the direction towards the power source and a voltage transformer 24 connected to the power line 14 in the direction towards the load. There is furthermore a control unit 26, which receives signals from both these transformers and detects currents and voltages based on these. For this reason the control unit is normally provided with various signal detecting units for detecting the voltages and currents of the transformers as well as A/D converters for providing digital versions of these measured voltages and currents. However, this is well known within the art and has therefore been omitted for the sake of simplifying the description of the present invention.

Figure 3:
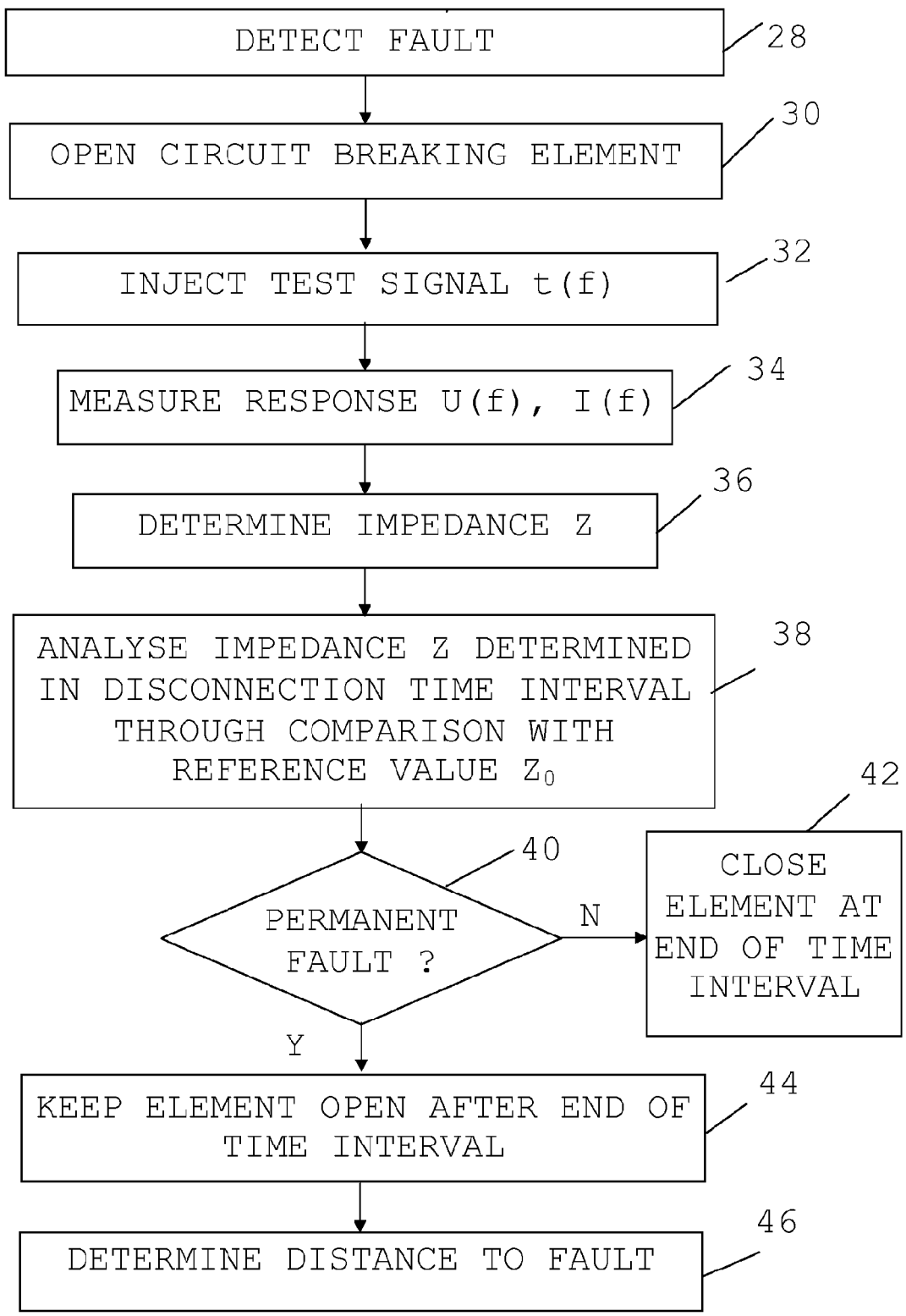
FIG. 3 is shows a flow chart of a number of method steps taken in a method operating a circuit breaking element of a circuit breaker according to the present invention.

The functioning of the present invention will now be described in relation to FIGS. 1, 2 and 3, where the latter shows a flow chart of a number of method steps taken in a method for operating a circuit breaker according to the present invention.

In normal operation the circuit breaking element 20 is normally closed. When the circuit breaking element 20 is closed the power source 12 supplies power to the load 16 via the power line 14. During this supply of power, the control unit 26 of the circuit breaker 18 monitors the power line 14 in relation to faults, which monitoring may be made via the current transformer 22, the voltage transformer 24 or both. If it detects a fault, step 28, which may be detected through the current having too high a value, the voltage having an error or an impedance determined based on the current and voltage having too low a value, the control unit 26 opens the circuit breaking element 20, step 30. The circuit breaking element 20 is then kept open at least for the duration of a predetermined disconnection time interval. This time interval is here the time interval normally provided for re-closing of circuit breakers. The opening of the circuit breaking element 20 here starts this disconnection time interval. During this disconnection time interval it is furthermore not possible to detect any current or voltage originating from the power source 12 in the power line 14.

During this time interval the control unit 26 generates a test signal t at a main frequency f. In this embodiment of the invention there is furthermore only one test signal, i.e. a single test signal, generated this way. The signal is a time-varying signal, like a periodic signal, the frequency spectrum of which shows one clearly dominating frequency. The test signal can in the simplest case be a sinusoidal signal, i.e. a signal where the main frequency f, is the only frequency contained in the signal. However it can also have any other suitable shape comprising multiple frequencies with one dominant frequency f, as for example a rectangular pulse signal or a saw tooth shaped signal. The main frequency f may be chosen to be asynchronous to any other harmonic present in the power line, so that the main frequency f is distinguishable and can be picked out from the spectrum of signals measurable in the power line 14. The main frequency is here thus different from the frequency of the power supply system. It is furthermore preferably provided in an interval of 20 Hz-1 kHZ, and most preferably between 47-500 Hz.

The test signal t(f) is injected by the control unit 26 into the power line 14 in the direction towards the load 16. It is more particularly applied to the low voltage side of the voltage transformer 24. In this embodiment of the invention there is only one tested line. Therefore a single test signal is injected. A response to the test signal t(f), which is received via the voltage transformer 24 is then measured by the control unit 26, step 34. Here the control unit measures both the voltage (U (f) and the current I (f) of the response.

From the measured voltage and current, U(f) and I (f), an impedance Z to ground of the power line 14 is determined or calculated, step 36. It should here be realised that the impedance Z to ground is determined based on the response of the test signal continuously during the disconnection time interval. The thus determined impedance Z is furthermore analyzed in this disconnection time interval, step 38. The analysis here involves comparing the impedance Z with a corresponding predetermined reference threshold, which is here a predetermined reference value $Z_0$. Based on this continuous comparison, the control unit 26 determines if there is a permanent or a temporary fault, step 40.

In case the determined impedance Z to ground remains below the predetermined value $Z_0$ for the duration of the disconnection time interval a permanent fault is determined, while if the impedance rises above the predetermined value before the time interval has expired a temporary fault is determined. Here the time interval may be about half a second long. The comparison of the impedance with the reference value may be understood as either the comparison of the real part of the measured impedance with a predetermined resistance value or as the comparison of the impedance in the complex plane with a predetermined range, where the range can for example be described by a circle in the complex plane and where the measured impedance must be lying inside or outside the circle. This may also be done through comparing the absolute value of the determined impedance with a reference value.

If a temporary fault was determined in this way, step 40, then the control unit 26 closes the circuit breaking element 20 at the end of the disconnection time interval, step 42. In this case it thus performs a regular reclosing of the circuit breaking element 20. However, if it determined that the fault was a permanent fault, step 40, the control unit 26 keeps the circuit breaking element 20 open after the end of the disconnection time interval, step 44. The disconnection of the power line 14 is thus prolonged beyond the end of the disconnection time interval. This means that re-closing of the circuit breaking element 20 is blocked. This blocking is then kept until the fault has been removed, which fault removal is normally performed by service personnel of the power supply system. It is here naturally possible to signal the fact that a permanent fault exists to monitoring equipment in the network, for instance to an IED (Intelligent Electronic Device). Thereafter the control unit 26 determines the distance to the fault, step 46. The distance to the fault may be determined through comparing the imaginary part of the determined impedance, possibly compensated with the impedance of the voltage transformer, with the reactance of the power line. The reactance of the power line is a property that is known in advance. Thus the imaginary part of this compensated impedance is then compared with the reactance of the line.

The impedance of the line that is determined can then be described in the following way:

$$Z=R_D+jX_D$$

where D indicates that the corresponding property is a determined property of the power line and X has a dependency of the frequency according to $X_D=j2\pi fL_D$ $L_D$ is here an inductive value.

At the same time the line has a known impedance per distance unit, which may be expressed as $$Z_L=R_L+jX_L$$

where L indicates line, the use of lower case letters is used to indicate that it is a measure per distance unit. Also here there is of course a frequency dependence in the reactance $x_L$ per distance unit.

The reactance xL per distance unit, for instance the reactance per kilometre, is then used together with the reactance X0 for finding the distance d to the fault according to:

$$D=X_D/X_L$$

From this comparison it is thus easy to determine the distance d to the fault.

The present invention therefore provides an improved circuit breaker, where it is possible to separate a permanent fault from a temporary fault. It is therefore possible to re-close the circuit breaking element only when the fault is temporary and not when it is permanent. Therefore the strain on the power supply system is reduced. At the same time the use of the power line is continued in case of temporary faults. More than 60% of the power line faults are often of such a temporary nature. A re-closing therefore provides a quick power restoration for a transmission line. Through determining the distance to a fault it is furthermore easy to know where service actions are to be performed.

The control unit of the circuit breaker may be provided through a processor together with program code for implementing the functions together with suitable voltage and current measurement units and A/D converters as well as a signal generator, for instance using an oscillator, which generates the test signal. A lot of this already exists in modern day circuit breakers, why the circuit breaker of the present invention can be obtained with little additional costs.

There are a number of modifications that can be made to the present invention. It is possible to use the invention without determining the distance to a fault. The injecting of a test signal is not limited to being performed during the disconnection time interval. It is possible to use it also when power is supplied. Then the test signal is modulated onto the power being supplied. This test signal may furthermore also be used for the detection of the existence of a fault. It is also possible to inject a further test signal into the power line, and then this further test signal would have another frequency that differs from both the frequency of the previously mentioned test signal as well as from the power supply frequency. The further test signal should also be in the same frequency range as the previously mentioned test signal. The further test signal provides redundancy in the analysis of a fault. The current transformer may be omitted. It is for instance possible to only use measurements made at the voltage transformer for also detecting a fault. The circuit breaker can finally also be used for detecting a forgotten safety ground.

What is claimed is:

1. A circuit breaker for protecting a power line comprising:
   a circuit breaking element for disconnecting the power line from a power source, and
   a control unit arranged to
      detect a fault on the power line,
      open the circuit breaking element based on said detected fault, which opening starts a pre-determined disconnection time interval,
      inject a test signal at a main frequency into said power line while the circuit breaking element remains open,
      measure a response voltage and a response current in the power line, where the response voltage and the response current result from the test signal (t(f)),
      determine an impedance to ground of the power line from the response voltage and the response current,
      analyse the impedance to ground of the power line over time during said disconnection time interval, said analysing including comparing the impedance to ground with a reference threshold,
      determine a permanent or a temporary fault of the power line based on the change of the impedance to ground during the disconnection time interval,
      re-close the circuit breaking element after the expiry of the disconnection time interval if the fault is determined to be a temporary fault, and
      keep the circuit breaking element open after the expiry of the disconnection time interval if the fault is determined to be a permanent fault.

2. The circuit breaker according to claim 1, wherein the control unit is arranged to determine a permanent fault if the determined impedance to ground remains below the reference threshold for all impedance determinations performed during said disconnection time interval.

3. The circuit breaker according to claim 1, wherein the control unit is further arranged to determine the distance to the fault in the power line based on the determined impedance to ground.

4. The circuit breaker according to claim 3, wherein the impedance to ground has a real and an imaginary part and the control unit is arranged to determine the distance to the fault through comparing the imaginary part of the impedance, with the reactance of the power line.

5. The circuit breaker according to claim 1, wherein the power source supplies AC power to the power line at a frequency and the test signal has a frequency, which differs from this power supply frequency.

6. The circuit breaker according to claim 1, wherein the frequency of the test signal is a frequency in the range of 20 Hz-1 kHz.

7. The circuit breaker according to claim 1, wherein the frequency of the test signal is a frequency in the range of 49 Hz-500 Hz.

8. A method of operating a circuit breaking element and being performed in a circuit breaker, comprising the steps of:
   detecting a fault on the power line,
   opening the circuit breaking element, which opening starts a pre-determined disconnection time interval,
   injecting a test signal at a main frequency into said power line while the circuit breaking element remains open,
   measuring a response voltage and a response current in the power line, where the response voltage and the response current result from the test signal,
   determining an impedance to ground of the power line from the response voltage and the response current,
   analysing the impedance to ground of the power line over time during said disconnection time interval, said analysing including comparing the impedance to ground with a reference threshold,
   determining a permanent or a temporary fault of the power line based on the change of the impedance to ground during the disconnection time interval,
   re-closing the circuit breaking element after the expiry of the disconnection time interval if the fault is determined to be a temporary fault, and
   keeping the circuit breaking element open after the expiry of the disconnection time interval if the fault is determined to be a permanent fault.

9. The method according to claim 8, wherein the step of determining a permanent or temporary fault includes determining a permanent fault if the determined impedance to ground remains below the reference threshold for all impedance determinations performed during said disconnection time interval.

10. The method according to claim 8, further comprising the step of determining the distance to the fault in the power line based on the determined impedance to ground.

11. The method according to claim 10, wherein the impedance to ground has a real and an imaginary part and the step of determining the distance to the fault in the power line includes comparing the imaginary part of the impedance with the reactance of the power line.

12. The method according to claim 8, wherein the power source supplies AC power to the power line at a frequency and the test signal has a frequency, which differs from this power supply frequency.

13. The method according to claim 12, wherein the frequency of the test signal is a frequency in the range of 20 Hz-1 kHz.

14. The method according to claim 9, further comprising the step of determining the distance to the fault in the power line based on the determined impedance to ground.

* * * * *